US010014093B2

(12) United States Patent
Pecoraro

(10) Patent No.: US 10,014,093 B2
(45) Date of Patent: *Jul. 3, 2018

(54) CABLE PROTECTION DEVICE AND SYSTEM

(71) Applicant: Michael Pecoraro, Colts Neck, NJ (US)

(72) Inventor: Michael Pecoraro, Colts Neck, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,304

(22) Filed: Aug. 3, 2016

(65) Prior Publication Data

US 2016/0343469 A1    Nov. 24, 2016

Related U.S. Application Data

(63) Continuation of application No. 14/221,653, filed on Mar. 21, 2014, now Pat. No. 9,484,724.

(60) Provisional application No. 61/804,323, filed on Mar. 22, 2013, provisional application No. 61/867,775, filed on Aug. 20, 2013.

(51) Int. Cl.
*F16L 55/00*    (2006.01)
*H01B 7/17*    (2006.01)
*H02G 3/04*    (2006.01)

(52) U.S. Cl.
CPC ............. *H01B 7/17* (2013.01); *H02G 3/0475* (2013.01)

(58) Field of Classification Search
CPC ................................ H02G 3/0475; H01B 7/17
USPC ................................... 138/103, 108, 110, 111
See application file for complete search history.

(56) References Cited

U.S. PATENT DOCUMENTS

| 338,310 | A | 3/1886 | Smith |
| 6,311,734 | B1 | 11/2001 | Petrovic |
| 6,433,282 | B1 | 8/2002 | Traversa |
| 6,668,865 | B2 | 12/2003 | Miyamoto |
| 7,591,286 | B2 | 9/2009 | Howard |
| 8,869,840 | B2 | 10/2014 | Lund |
| 2003/0016989 | A1 | 1/2003 | Wentworth |
| 2006/0260833 | A1 | 11/2006 | Blase |
| 2010/0178015 | A1 | 7/2010 | Kadmoska |
| 2011/0034257 | A1 | 2/2011 | Wen |
| 2014/0137974 | A1 | 3/2014 | Lunceford |

OTHER PUBLICATIONS

Office Action for corresponding U.S. Appl. No. 14/221,653, 14 pages, dated Mar. 18, 2016.

*Primary Examiner* — Vishal Pancholi
(74) *Attorney, Agent, or Firm* — Timothy X. Gibson, Esq.; Gibson & Dernier LLP

(57) ABSTRACT

A cover is provided for protecting cables. The cover includes a first cover member and a second cover member. The second cover member is configured to mate with the first cover member to define conduits that enclose and permit passage therethrough of one or more cables. Plural covers are couplable to form an articulating cover system operable to enclose a selected length of cable(s). The covers may be employed to protect hoses, pipes, ducts and the like.

20 Claims, 15 Drawing Sheets

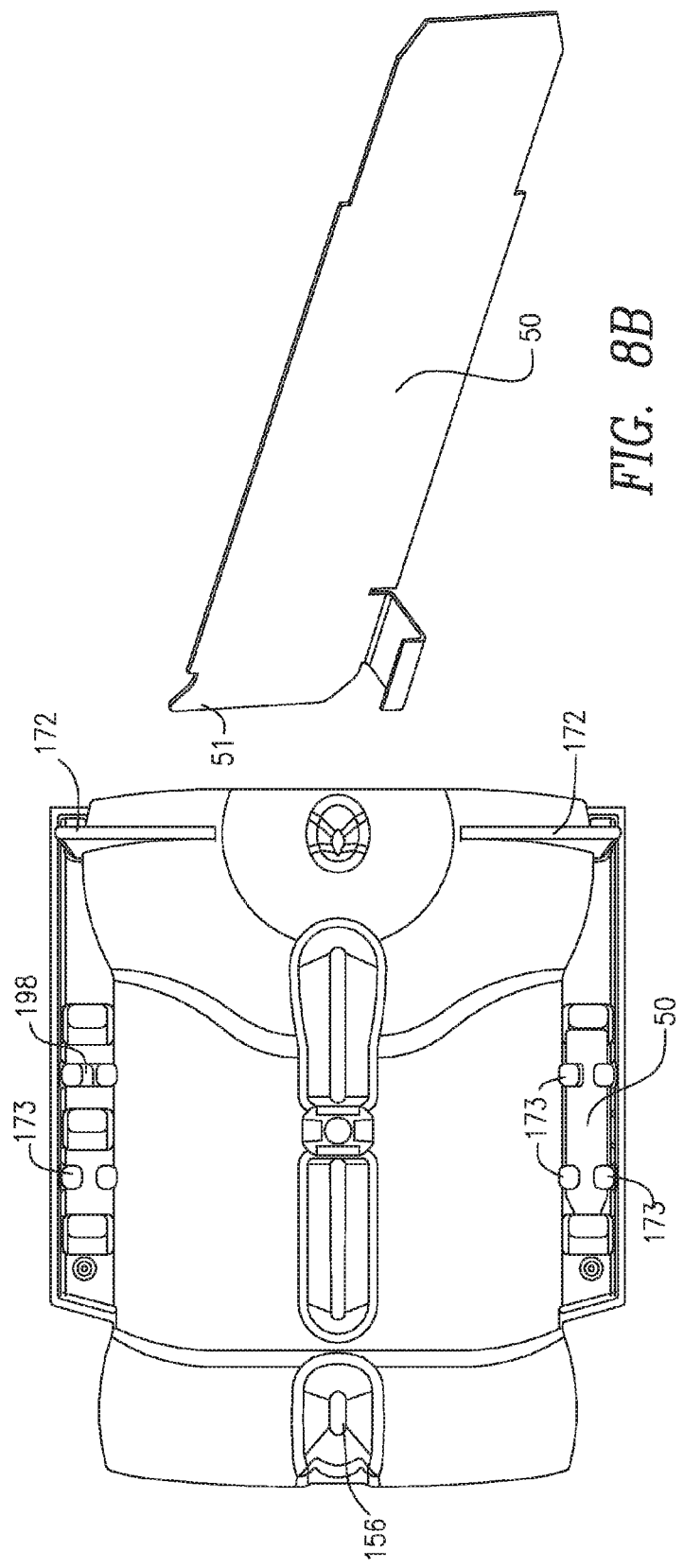

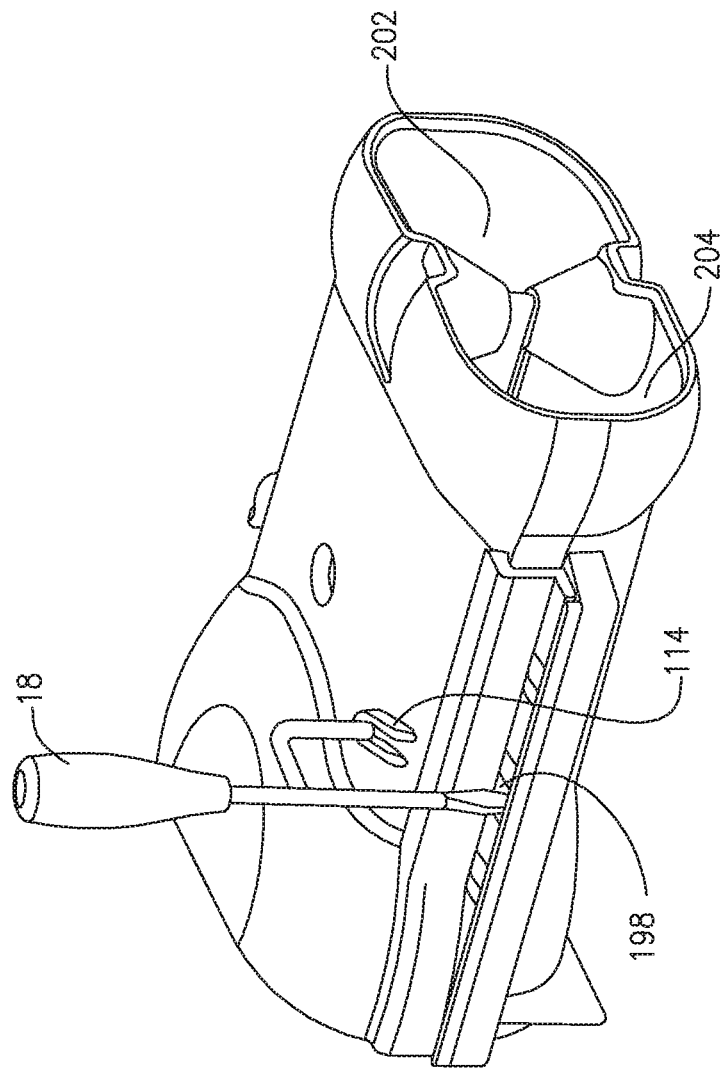
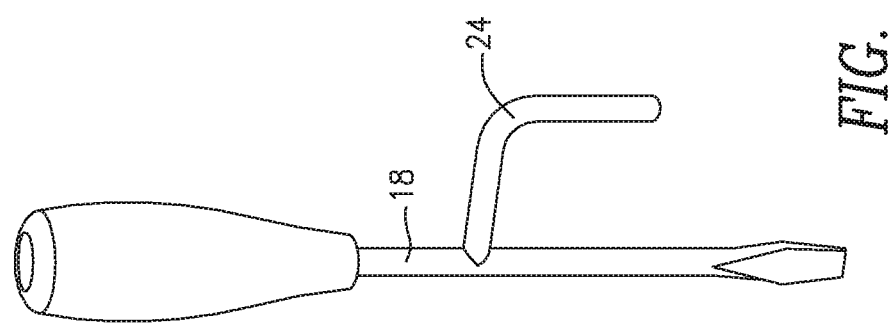

CABLE PROTECTION DEVICE AND SYSTEM

CROSS-REFERENCE TO RELATED APPLICATIONS

This application is a continuation of U.S. patent application Ser. No. 14/221,653, filed Mar. 21, 2014, and claims the benefit of U.S. Provisional Patent Application No. 61/804,323, filed Mar. 22, 2013, and U.S. Provisional Patent Application No. 61/867,775, filed Aug. 20, 2013, the entireties of which are incorporated herein by reference.

FIELD OF THE INVENTION

The invention relates to protective devices and in particular, protective covers for power cables.

BACKGROUND

Power outages and shortages are commonplace. To deal with such outages, and to avoid and/or minimize shortages/blackouts, it is typical for electric power cables to be added to the power grid to bypass damaged electrical equipment and/or problem areas, such as areas where overload may occur, while the electrical equipment is being repaired. These power cables, which house live electric wires in various sizes, and typically are laid on the ground surface, sometimes in pedestrian areas, need to be covered in some way to protect pedestrians from accidental shock and the cables themselves from damage. Currently, such protection is provided by boxing the cables with wooden boards nailed together. The installation of such boxes is labor intensive and the use of nails and nail guns near the cables invites disaster.

SUMMARY OF THE INVENTION

There is a need in the art for a protective device for exposed cables that are situated in pedestrian areas. It would be advantageous to provide a protective device that may be adapted to any length of cable and provide protection for the cable over varying terrain. It would be further advantageous to provide such a device that would permit movement of the protected cable without removing the protective device from the cable. It would be further advantageous to provide such a device that is easy to install and remove but include features that prevent inadvertent removal.

In accordance with one embodiment, a cable protection cover is provided which includes a first cover member and a second cover member configured to enclose a segment of power cable. The second cover member is configured to mate with the first cover member to define at least one conduit configured to receive a length of cable to be protected. In one embodiment plural conduits are defined. The first cover member and second cover member may be configured to be removably and securely connected to each other and to adjacent similar or same cable protection covers.

In one embodiment each of the first and second cover members includes at least one recess formed therein on a first side and a post extending substantially perpendicular from a surface of a second side opposite the first side, wherein the recess is dimensioned to receive a post of an adjacent same cover member. The posts and recesses of the first and second cover members are configured and operable to provide coupling and articulation between adjacent covers.

In one embodiment the covers disclosed herein are configured with two substantially parallel conduits to enclose two cables side by side, each of which may be any diameter, for example 1 to 4 inches in diameter. It will be apparent the cover may be any size required for a particular application, and the conduits may likewise be any size. In one embodiment the cables to be enclosed may be 3.25 inches in diameter. The diameter of the conduits of the cover may be any size required to enclose cables, for example, from about 1 to about 5 inches.

In accordance with a further embodiment, a protective cover as disclosed herein may includes a first cover member and a second cover member configured to mate with the first cover member to define at least one conduit operable to enclose a length of material to be protected, the first cover member including first surface having a recess formed therein proximate a first end of the first cover member, a second surface opposite the first surface having a post extending substantially perpendicular from the second surface, the post positioned proximate a second end of the first cover member opposite the first end, and at least one mating element disposed along at least a portion of a periphery of the first cover member, the second cover member including a first surface having a post extending substantially perpendicular therefrom proximate a first end of the second cover member and a second surface opposite the first surface including a recess formed therein, the recess positioned proximate a second end of the second cover member opposite the first end, and at least one mating element disposed along at least a portion of a periphery of the second cover member, wherein the at least one mating element of the first cover member is operable to releasably engage the at least one mating element of the second cover member, wherein the cover is configured to be articulatably coupled to an adjacent cover.

As used herein, the term "articulatably" means coupled elements form a joint which permits relative movement (e.g., including pivotable movement, etc.) between the coupled elements.

In one embodiment, the first cover member may include a wall disposed on and extending substantially perpendicular from the first cover member second surface, and the second cover member may include a wall disposed on and extending substantially perpendicular from the second cover member first surface, wherein at least a portion of the wall of the first cover member and at least a portion of the wall of the second cover member are configured to abut when the first cover member is coupled to the second cover member.

In a further embodiment, the first cover member may include at least one hemispherical section formed in the second surface thereof, the at least one hemispherical section oriented along the axis of the first and second ends of the first cover member. The second cover member may also include at least one hemispherical section formed in the first surface thereof, the at least one hemispherical section oriented along the axis of the first and second ends of the second cover member. Each of the hemispherical sections may define substantially half, or more or less, of the conduit(s).

In still a further embodiment, the at least one mating element of the first cover member may include a flange extending from a side thereof and at least one lip depending from the flange, and the at least one mating element of the second cover member may include a flange extending from a side thereof and at least one lip receiving aperture configured to receive the at least one lip of the first cover member. The mating elements of the first cover member and second cover member may in one embodiment be operable to be slidably engageable to each other.

In a further embodiment, the first member may be nestable and/or stackable on like first members for compact storage. The second member may likewise be nestable and/or stackable. In another embodiment, the cover members may include one or more ribs to stiffen the first and/or second member to distribute any loads on the first and second members.

In another embodiment, the cover includes alternate or additional means to secure the first and second members to each other. For example, an aperture may be formed between mating surfaces for receiving a screw or the like to secure the first and second members.

In one embodiment the first cover member and the second cover member may include releasable mating means operable to lock the respective members. The cable protection cover may also include a quick-release mechanism which may be positioned for easy access by a user. In one embodiment the quick-release device is positioned under an outer edge of the cable protection device so that it is not readily apparent to pedestrians. In one embodiment the cover includes a quick-release device operable to securably engage the first and second cover members and further operable to release secure engagement of the first and second cover members upon application of manual pressure to the quick-release device.

In one embodiment the cable protection cover includes a means to secure the cover to a surface such as a roadway. For example, a recess or aperture may be formed in a first member, and a corresponding recess or aperture formed in the second member in register with the first member recess or aperture, for receiving a stake which may be driven through the assembled cable protection device and through the ground. The cover may include surfaces operable to receive reflective sheeting such as pressure sensitive reflective sheeting.

The first surface of the second cover member may include a region contoured to receive a portion of, and provide pivotable engagement with, a second surface of an adjacent second cover member. The region may include the post of the second cover member. The first surface of the first cover member may include a region contoured to receive a portion of, and provide pivotable engagement with, a second surface of an adjacent first cover member. The region may include the recess of the first cover member.

The covers disclosed herein may be constructed of any suitable material. The covers are preferably formed of resilient, durable material so as to be reusable after each use. In one embodiment the first and second cover members are constructed of HDPE, polymers with similar characteristics, fiberglass, metal, ceramic or other materials. The first and second cover members may be unitarily molded covers.

The covers disclosed herein may be sized and dimensioned to accommodate any cable or plural cables. In one embodiment, covers may have dimensions of about 12 to about 48 inches in length and about 8 to about 16 inches in width. The height of each cable protection device may be from about 4 to about 8 inches. In one embodiment the device is 12.26 inches in width, 14.21 inches in length and 6.11 inches in height. In another embodiment the device is 12.26 inches in width, about 48 inches in length and 6.11 inches in height. However, those skilled in the art will recognize that the dimensions of the covers may be modified without departing from the spirit and/or scope of the invention.

In accordance with one embodiment, a segmented articulating cable protection system is provided in which adjacent cable protection covers are couplable to each other such that the adjacent covers are moveable in relation to each other. The system is configured to completely contain one or more cables such that it protects the cables from outside elements and pedestrians from shock or other injury. The system is operable to flex in multiple directions including left, right, up and down and various degrees in between without any other parts or attachments. For example, the system is operable to articulate and thereby bend around corners and over curbs, speed bumps or any other uneven surface.

In one embodiment, a protective cover system includes a plurality of protective covers, each of the protective covers including a first cover member and a second cover member configured to mate with the first cover member to define at least one conduit operable to enclose a length of material to be protected, the first cover member having a first surface including a recess formed therein proximate a first end of the first cover member, a second surface opposite the first surface including a post extending substantially perpendicular from the second surface, the post positioned proximate a second end of the first cover member opposite the first end, and at least one mating element disposed along at least a portion of a periphery of the first cover member, the second cover member including a first surface including a post extending substantially perpendicular therefrom proximate a first end of the second cover member and a second surface opposite the first surface including a recess formed therein, the recess positioned proximate a second end of the second cover member opposite the first end, and at least one mating element disposed along at least a portion of a periphery of the second cover member, wherein the at least one mating element of the first cover member is operable to releasably engage the at least one mating element of the second cover member, wherein the covers are configured to be articulatably coupled to adjacent covers.

The devices and systems disclosed herein enable power companies to quickly and efficiently house/protect power lines with a reusable product enhancing worker and pedestrian safety, and decrease the likelihood of damage to power lines. The first member is easily removable from the second member without the need to move the cable housed within the device. The first and second members of each cable protection device form a cover which is securely connectable to adjacent covers via a tool-free connection.

Cable cover systems in accordance with the disclosure are operable to prevent access and completely hide cables from view, even as the joints are articulated. The devices and systems disclosed do not trap water, and are preferably made of durable material with low percentage water absorption. The devices and systems provide a means for allowing the cable to be routed around corners. For example, in some embodiments, there is a minimum bend radius of 4 feet on center of cable cover when a 12 inch long device is employed. In a longer device, for example, a 48 inch long segment, the radius has a proportional bend radius. Devices in accordance with the present disclosure are configured and constructed to withstand heavy loads.

Moreover, the covers disclosed herein may be used to protect, hoses, ducts, pipes and the like.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 8A is a bottom plan view of a second cover member of a cable protection cover in accordance with one or more embodiments of the present invention;

FIG. 8B is a perspective view of a quick-release element 50 in accordance with one or more embodiments of the present invention;

FIG. 8D is a perspective view of a tool operable to be used in accordance with one or more embodiments of the present invention;

FIG. 8E is a perspective view of the tool of FIG. 8D seated in a position relative to a cover in accordance with one or more embodiments of the present invention;

DETAILED DESCRIPTION OF THE INVENTION

Figure 1:
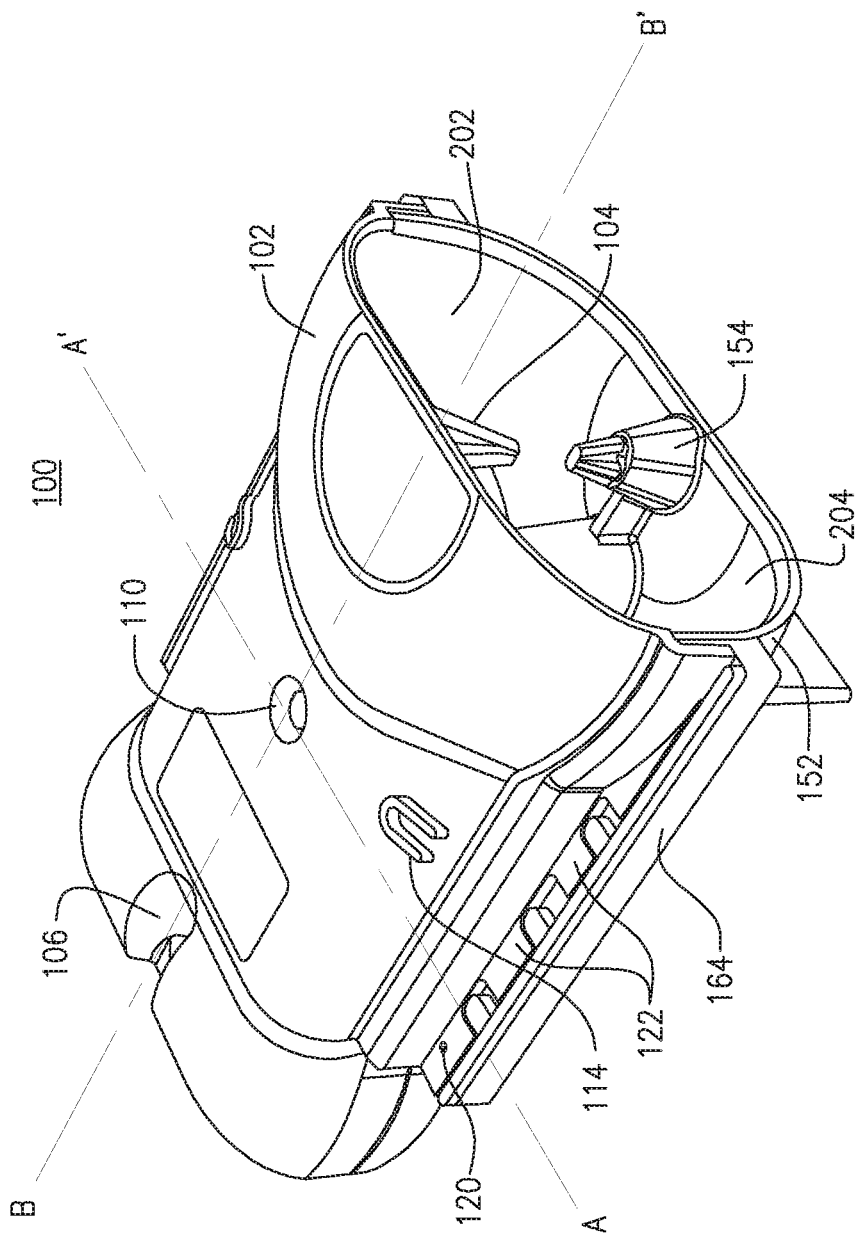
FIG. 1 is an elevated perspective view of a cable protection cover in accordance with one or more embodiments of the present invention.
Figure 2:
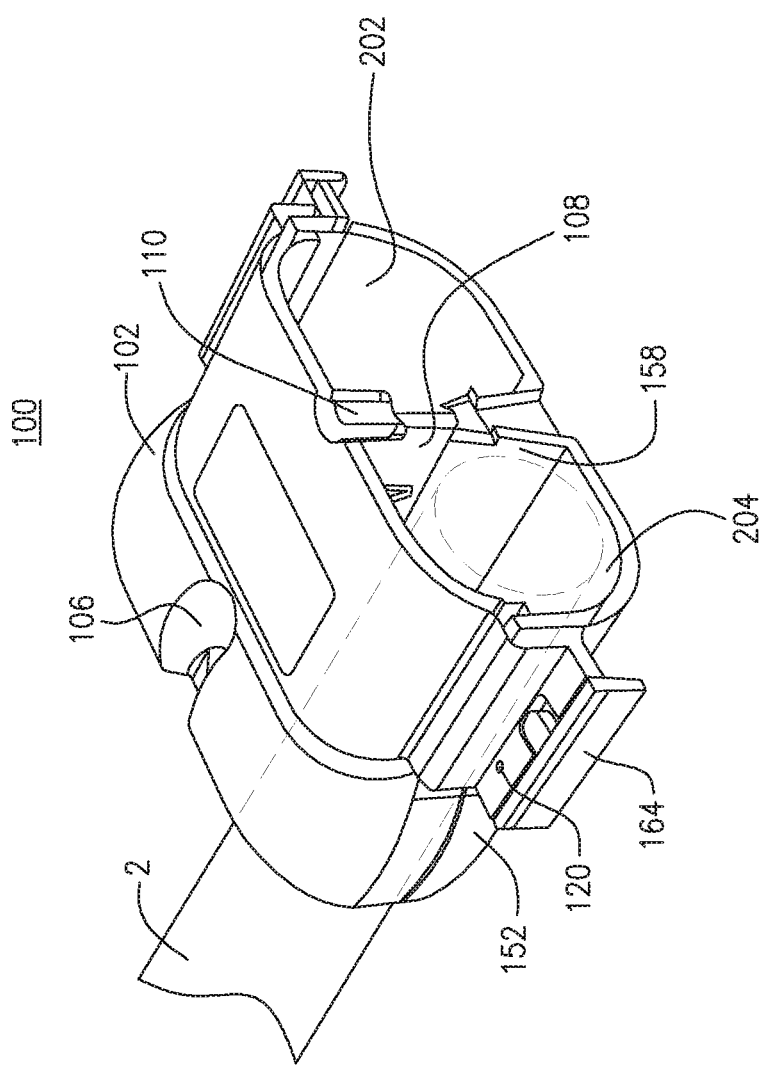
FIG. 2 is a cross-sectional view of the cable protection cover of FIG. 1 taken along line A-A' with a cable 2 shown partially in phantom.
Figure 3:
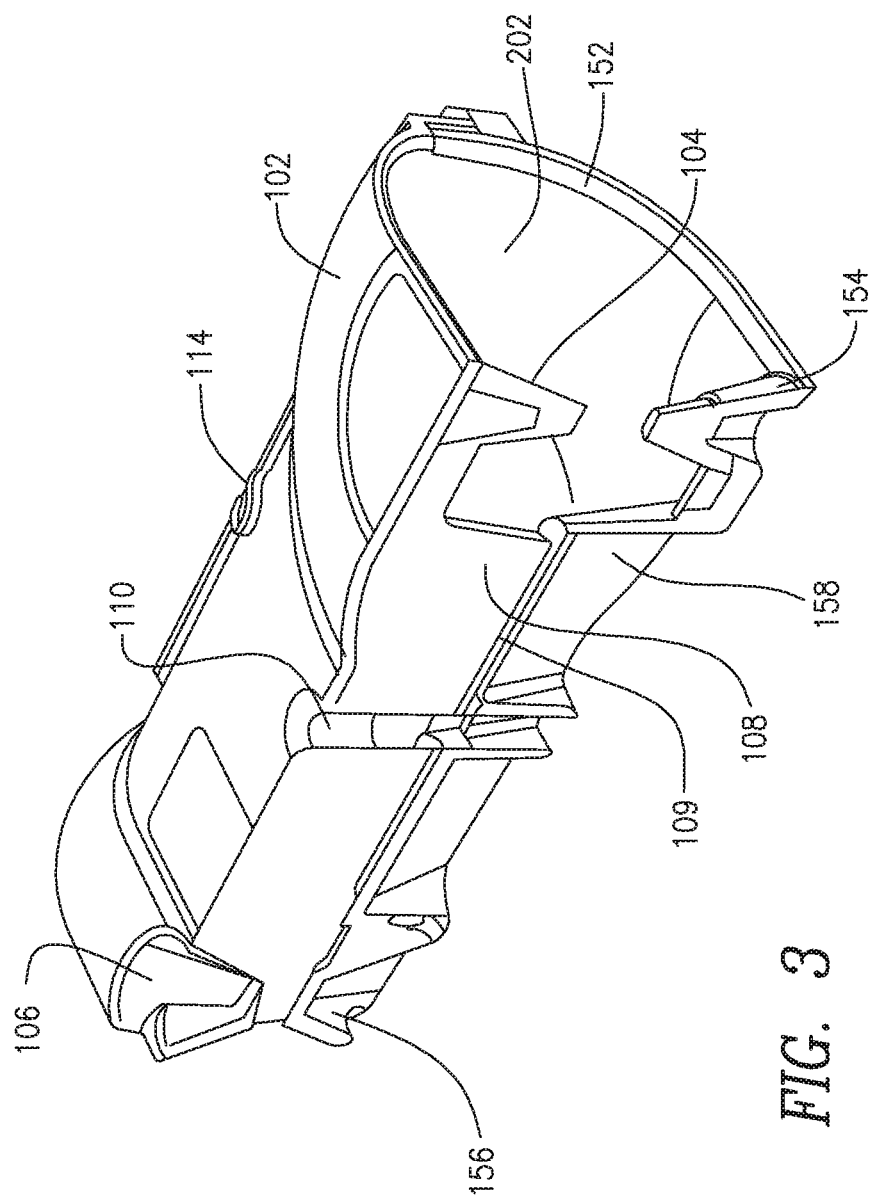
FIG. 3 is a cross-sectional view of the cable protection cover of FIG. 1 taken along line B-B'.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention may be used to protect for exposed cables situated in pedestrian areas. For example, covers and systems disclosed herein provide a protective device that may be adapted to any length of cable and provide protection for the cable over varying terrain. The disclosed covers permit movement of the protected cable without removing the cover from the cable. The disclosed covers and systems are easy to install and remove but include features that prevent inadvertent removal.

Embodiments of the present invention will now be described with reference to the FIGS. With reference to FIGS. 1-7, a protective cover 100 according to embodiments of the invention is shown. The protective cover 100 includes a first cover member 102 and a second cover member 152. In the closed position illustrated in FIGS. 1-3, the second cover member 152 mates with the first cover member 102 to define conduits 202, 204 operable to enclose and permit passage therethrough of cable 2 to be protected. As illustrated in FIGS. 1-6, the first cover member 102 and the second cover member 152 may include hemispherical sections formed therein, each of which define substantially half of the conduits 202, 204. However, in other embodiments each of the cover members 102, 152 may form less or more than half of the conduits 202, 204.

Figure 4:
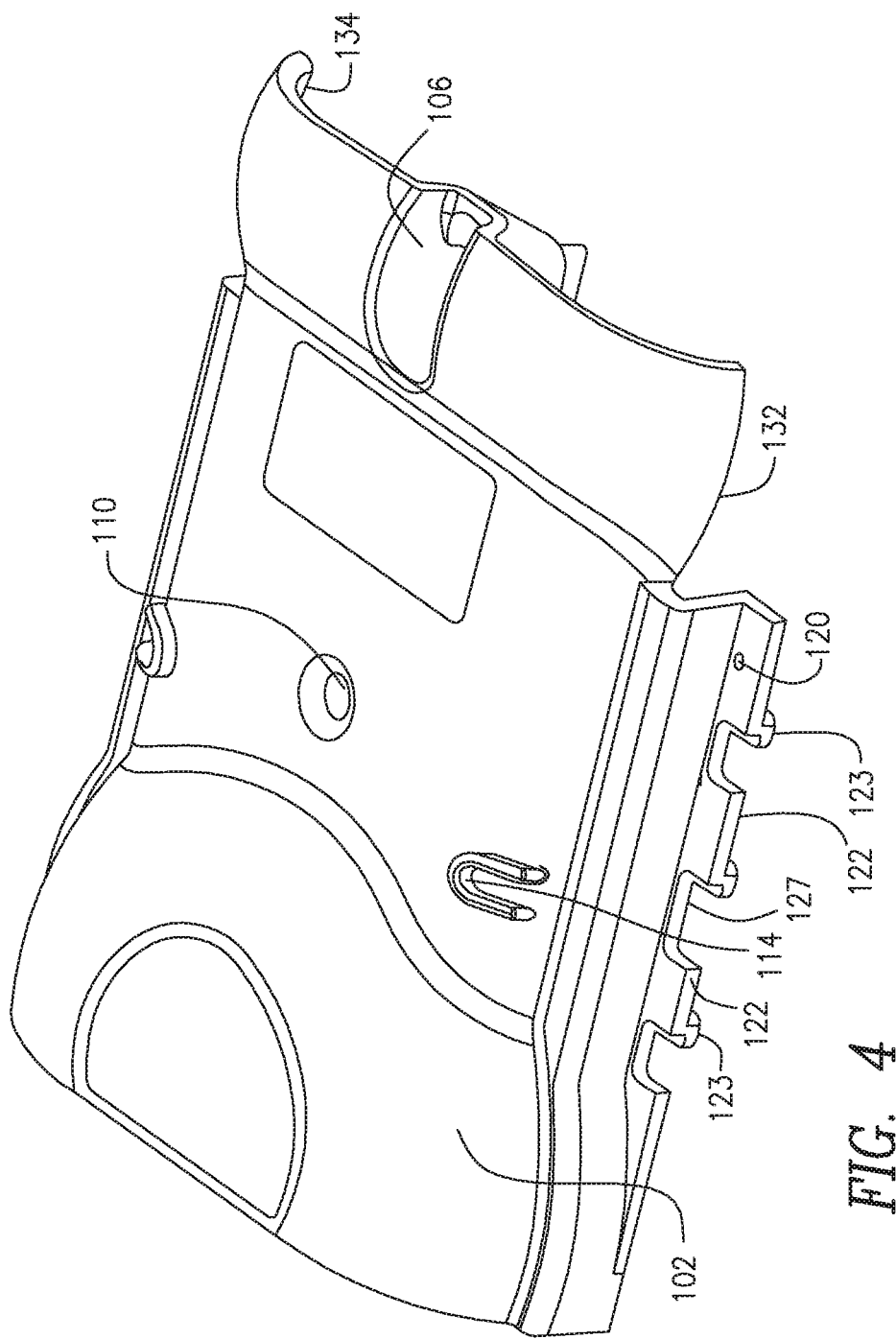
FIG. 4 is an elevated perspective view of a first cover member of a cable protection cover in accordance with one or more embodiments of the present invention.
Figure 5:
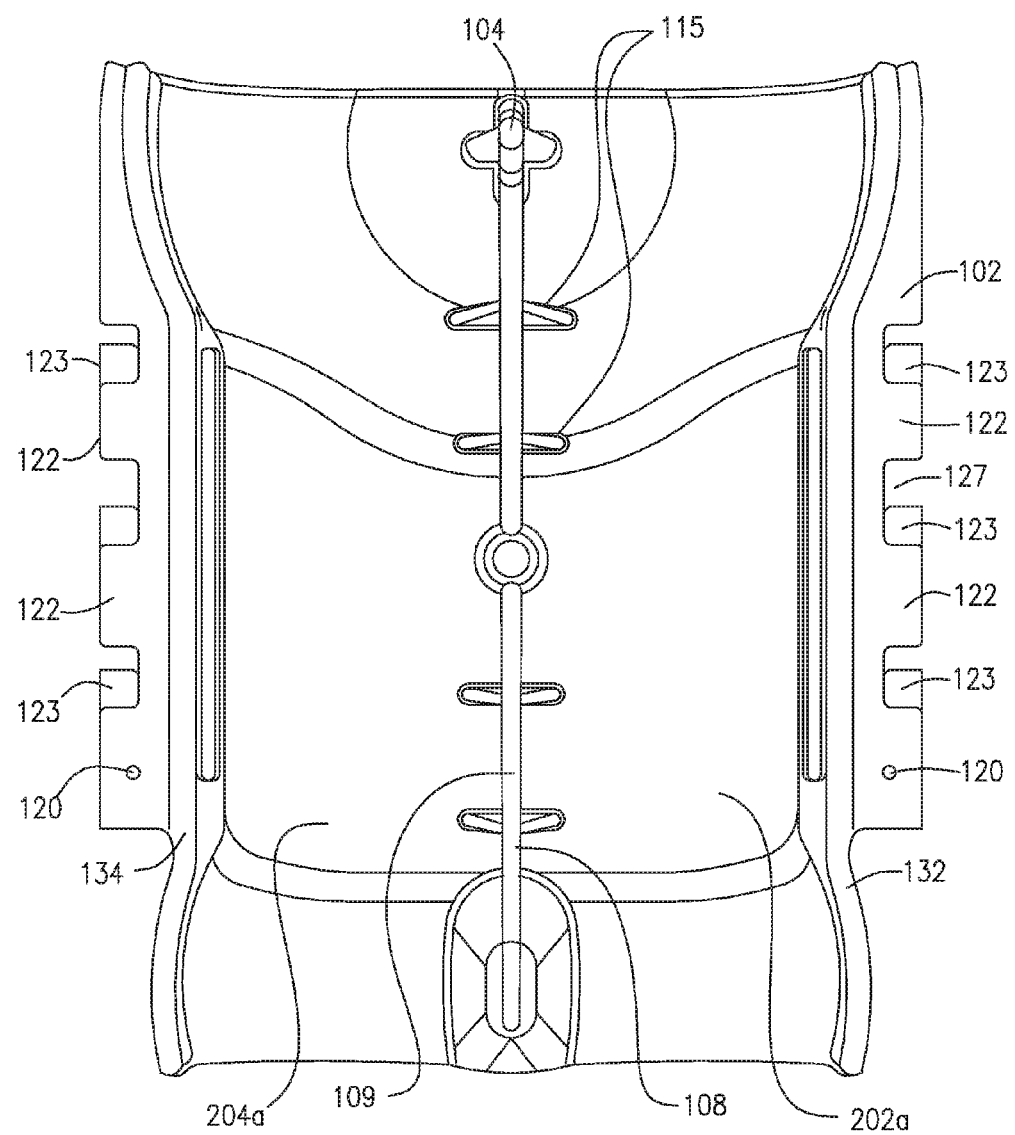
FIG. 5 is a bottom plan view of the cover member of FIG. 4.

With further reference to FIGS. 4 and 5, first cover member 102 includes recess 106 in a top surface thereof positioned at a first end of the cover member 102 and a mating element operable to engage a complementary mating element of the second cover member 152. In one embodiment, the mating element may include flanges 122 extending from sides of the first cover member 102 and lips 123 depending from the flanges 122. First cover member 102 may further include wall 108 extending along a long axis of the bottom side of the first cover member 102, ribs 115 supporting wall 108 for structural integrity, and post 104 positioned at a second end of the cover member 102 and extending upward from the bottom surface of the cover member 102. Hemispherical sections 202a and 204a, which may each form approximately half of conduits 202 and 204, respectively, may be formed between side wall 132 and wall 108 (forming 202a) and side wall 134 and wall 108 (forming 204a). First cover member 102 may further include apertures 110 and/or 120, which may be in register with like apertures formed in the second cover member 152, and tool brace 114.

Figure 6:
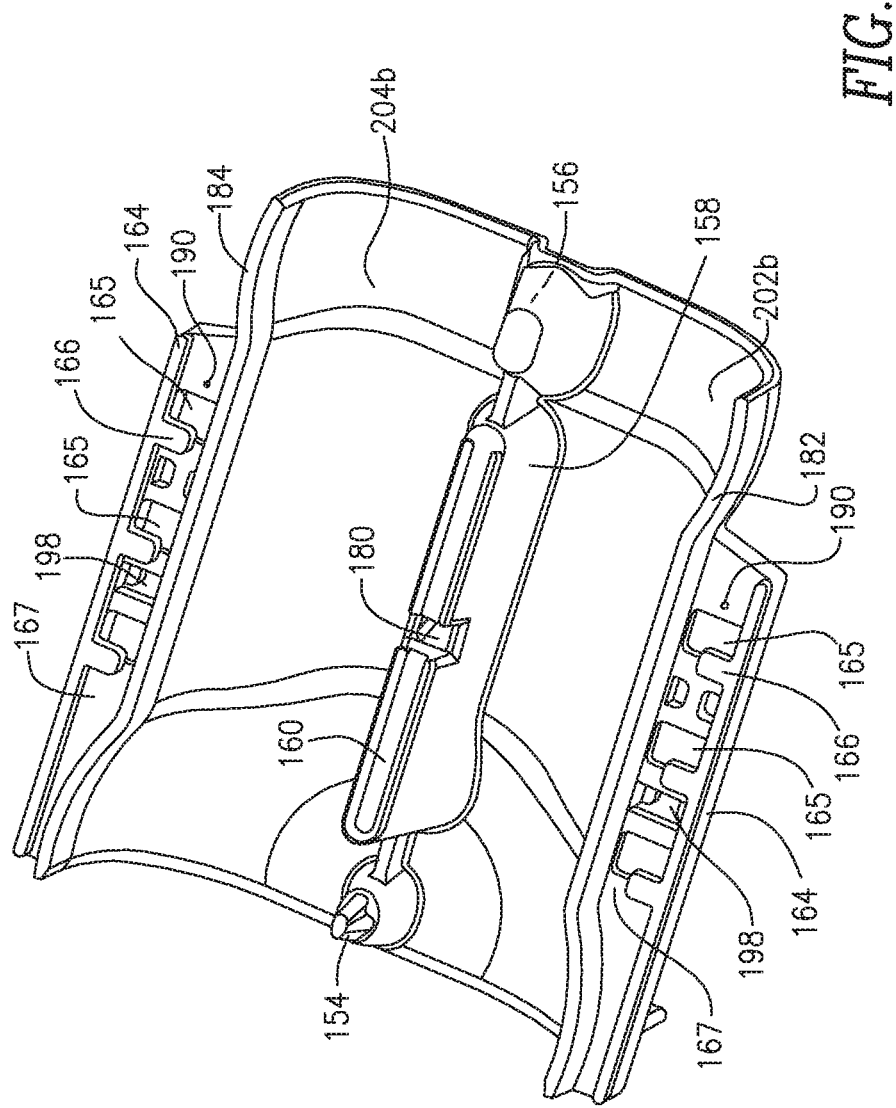
FIG. 6 is a top plan view of a second cover member of a cable protection cover in accordance with one or more embodiments of the present invention.

With further reference to FIG. 6, second cover member 152 includes post 154 positioned at a first end of the cover member 152 and extending upward from the top surface of the second cover member 152, a recess 156 (see also FIGS. 3 and 8A) formed in the bottom surface and positioned at a second end of the second cover member 152 and a mating element operable to engage a complementary mating element of the first cover member 102. In one embodiment the mating element may include flanges 164 and 166 extending from a side of the second cover member 152 and tabs 166 and apertures 165 positioned on the flanges 164. The second cover member 152 may further include a wall 158 extending along a long axis of the top side of the second cover member 152. Hemispherical sections 202b and 204b, which each form approximately half of conduits 202 and 204, respectively, may be formed between side wall 182 and wall 158 (forming section 202b) and side wall 184 and wall 158 (forming section 204b). Second cover member 152 may further include apertures 180 and/or 190, which may be in register with like apertures 110 and 120, respectively, formed in the first cover member 102 and tool access opening 198.

Figure 7A:
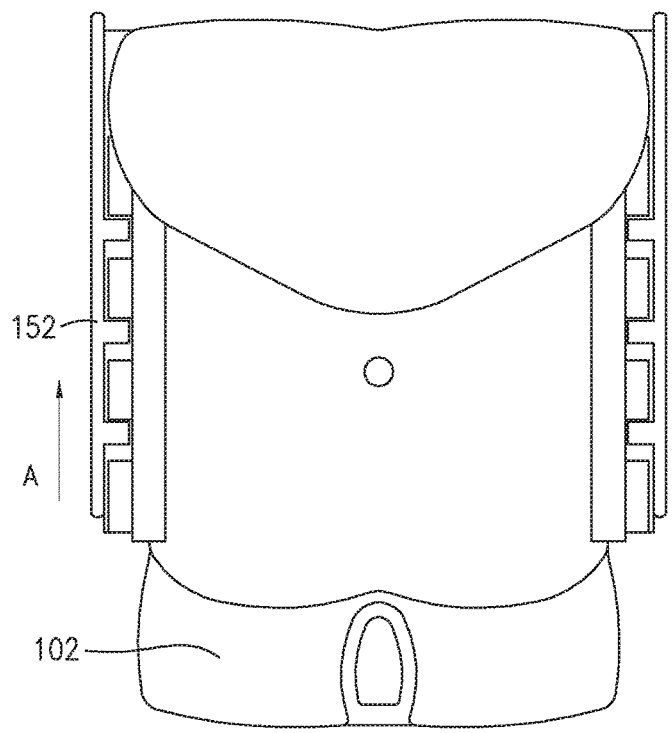
FIG. 7A is a top view of a first cover member in accordance with one embodiment disposed on a second cover member in a first position ready to be slidably engaged to the second cover member by movement in the direction shown by arrow A in accordance with one or more embodiments of the present invention.
Figure 7B:
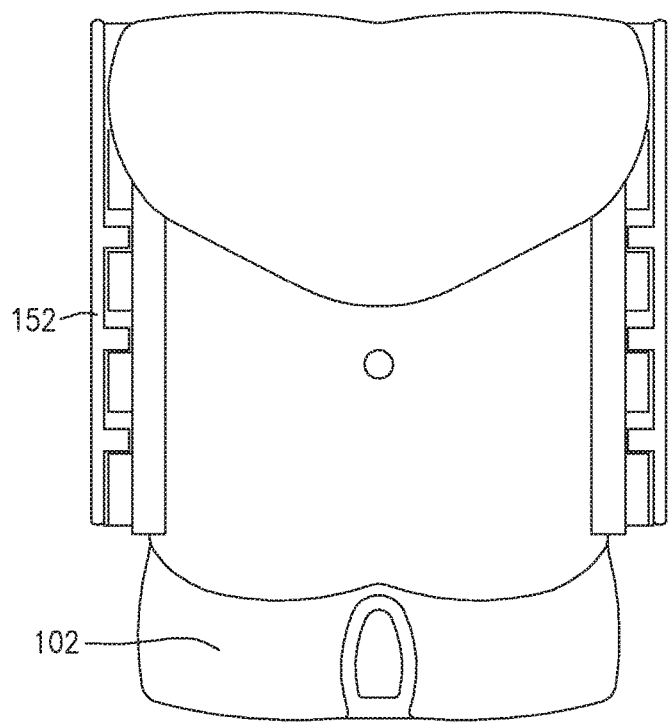
FIG. 7B is a top view of a first cover member in accordance with one embodiment disposed on a second cover member in a second position engaged to the second cover member in accordance with one or more embodiments of the present invention.

With further reference to FIGS. 7A and 7B, the first cover member 102 may be coupled to second cover member 152 by positioning the first cover member so that end 109 of wall seats in recess 160 formed in wall 158 of second cover member 152 and flanges 122 of the first cover member 102 are aligned and seated in channels 167 of flanges 164 of the second cover member 152. Lips 123 seat in apertures 165 formed in the channels 167. Advancing the first cover member 102 in the direction of arrow A of FIG. 7A causes the lips 123 of the first cover member to slidably engage flanges 164 via apertures 165 to form a releasable engagement between the first and second cover members 102, 152.

It will be apparent to the skilled artisan that the mating elements of the first and second cover members 102 and 152 may be juxtaposed. It will also be apparent that other mating means, such as clamps, adhesives, kook and loop fasteners or the like, may be used to form an enclosure from the covers 102, 152.

Furthermore, in some embodiments, the respective cover members 102, 152 may be a unitary assembly hingedly connected at edges thereof, for example, by a living hinge or the like. However, the use of two cover members as illustrated in the figures may facilitate installation of the protective cover 100 on one or more cables. It will be further understood that the respective cover members 102, 152 may be parts that may be interchangeably used as the first cover member 102 or the second cover member 152 based on the orientation of application of the respective cover.

With further reference to FIG. 8A, a bottom side of the second cover member 152 includes post 156 and optionally braces 172 to provide a level surface-contacting face for the second cover member. In the illustrated embodiment, the second cover member is typically employed as a base piece which contacts the ground. Braces 172 provide stabilizing structures for ground contact.

Cover member 152 may include a quick-release device 50 for decoupling the first and second cover members 102, 152. With further reference to FIG. 8B, quick-release device 50 may be a resilient strip such as metal, plastic or the like positioned in a flange 164 and retained by tabs 173. Device 50 includes a detent 51 operable to engage a lip 123 of the first cover member 102 when the first and second cover members are slidably engaged, preventing the cover members 102, 152 from becoming disengaged. The quick-release device 50 may be released by manual pressure to permit slidable disengagement of the respective first and second cover member 102, 152.

Figure 8C:
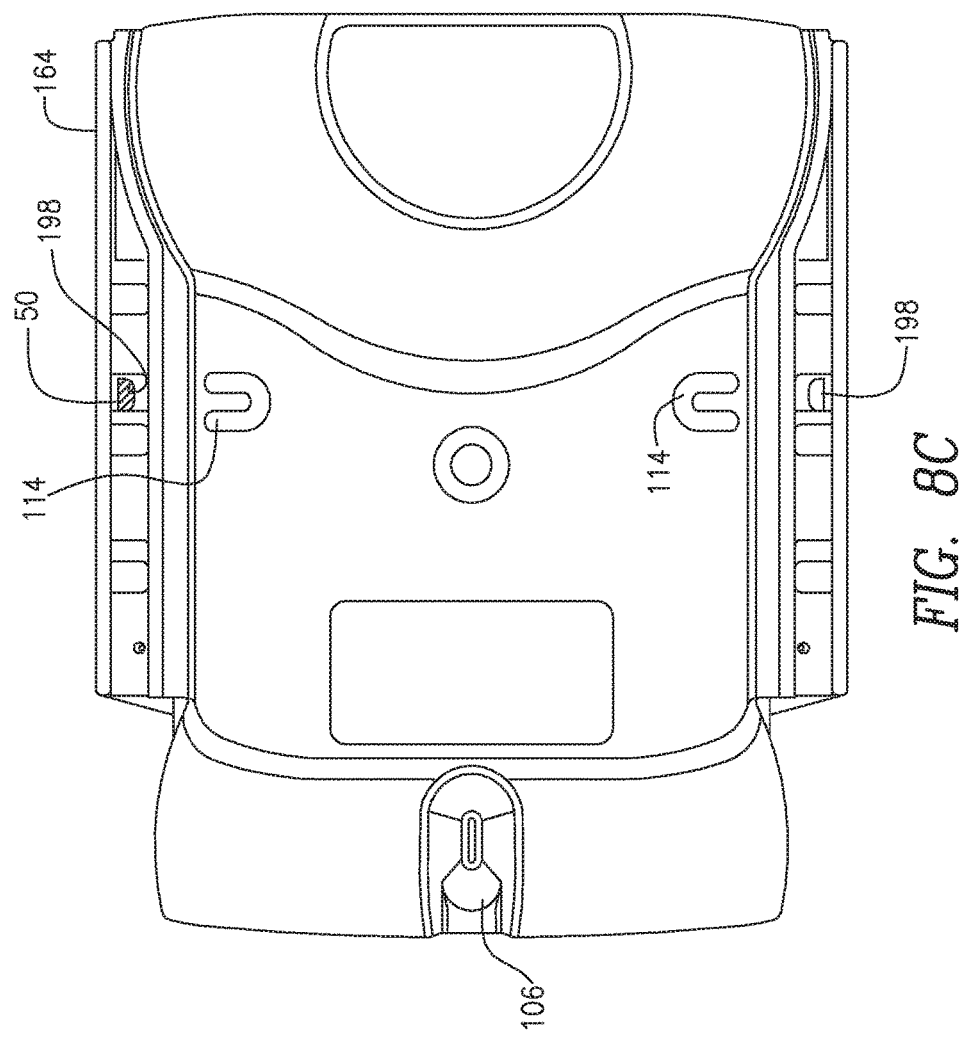
FIG. 8C is a top plan view of a first cover member engaged to a second cover member in accordance with one or more embodiments of the present invention.

With further reference to FIG. 8C, in one embodiment, an access aperture 198 may be formed in flange 164 to permit insertion of a tool to depress the device 50, disengaging the detent 51 of device 50 from lip 123 and permitting the first and second cover members to be disengaged by sliding the first cover member 102 in the opposite direction of arrow A shown in FIG. 7A. Any tool sized and dimensioned to access the device 50 through aperture 198 may be employed for this purpose. With reference to FIGS. 8D and 8E, in one embodiment a tool 18 is disclosed which is specifically designed for the purpose of accessing the quick-release device 50 through aperture 198 and depressing the device 50 to release the engagement between the cover members 102, 152. Tool 18 may be essentially a standard screwdriver modified to include a support 24 extending therefrom. As shown in FIG. 8E, tool 18 is positioned with the working end of the tool (i.e., the screwdriver end) in aperture 198 and support 24 is positioned adjacent brace 114. Downward pressure of the tool 18 on quick-release device 50 effects release of the device 50.

Those skilled in the art will recognize that any releasable engagement means may be employed in embodiments of the present disclosure. For example, screws, bolts and the like may be used to releasably engage the first and second cover members 102, 152.

The first and second cover members 102, 152 may be further secured to each other by inserting a screw or the like through apertures 120, 190 of the respective first and second cover members 102, 152 to prevent vandalism, accidental displacement, etc.

The cover 100 may be secured to a surface such as a roadway by inserting a securing a stake, rebar spike or the like through apertures 110, 180 of the cover 100 and through the ground.

The cover 100 may include surfaces operable to receive indicia and/or reflective material such as reflective paint, reflective sheeting such as pressure sensitive reflective sheeting etc.

Figure 9:
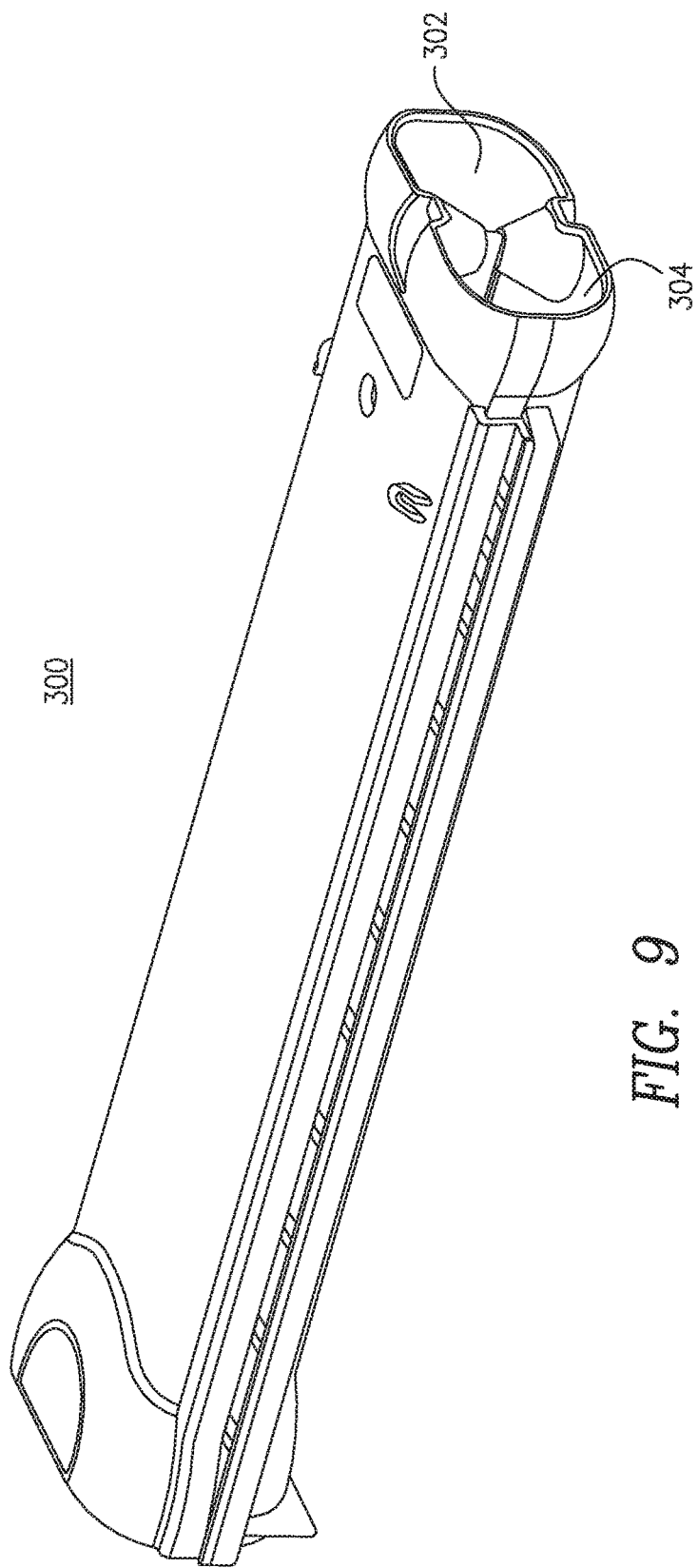
FIG. 9 is a perspective view of a cover in accordance with one or more embodiments of the present invention.

Now referring to FIG. 9, an elongated embodiment of the device 300 is shown. It will be apparent that the cover may be any length and any width to accommodate various arrangements of cables to be covered and various conditions. For example, in one embodiment the cover may have dimensions of about 12 to about 48 inches in length and about 8 to about 16 inches in width. The height of each cover may be from about 4 to about 8 inches. In one embodiment the cover is 12.26 inches in width, 14.21 inches in length and 6.11 inches in height. In another embodiment the cover is 12.26 inches in width, about 48 inches in length and 6.11 inches in height. Similarly, the illustrated embodiments are configured with two substantially parallel conduits to enclose two cables side by side, each of which may be any diameter, for example 1 to 4 inches in diameter. It will be apparent the cover may be any size required for a particular application, and the conduits may likewise be any size. In one embodiment the cables to be enclosed may be 3.25 inches in diameter. The diameter of the conduits of the cover may be any size required to enclose cables, for example, from about 1 to about 5 inches. Moreover, more or fewer than two conduits may be provided in the cover. However, those skilled in the art will recognize that the dimensions of the device may be modified without departing from the spirit and/or scope of the invention.

Figure 10A:
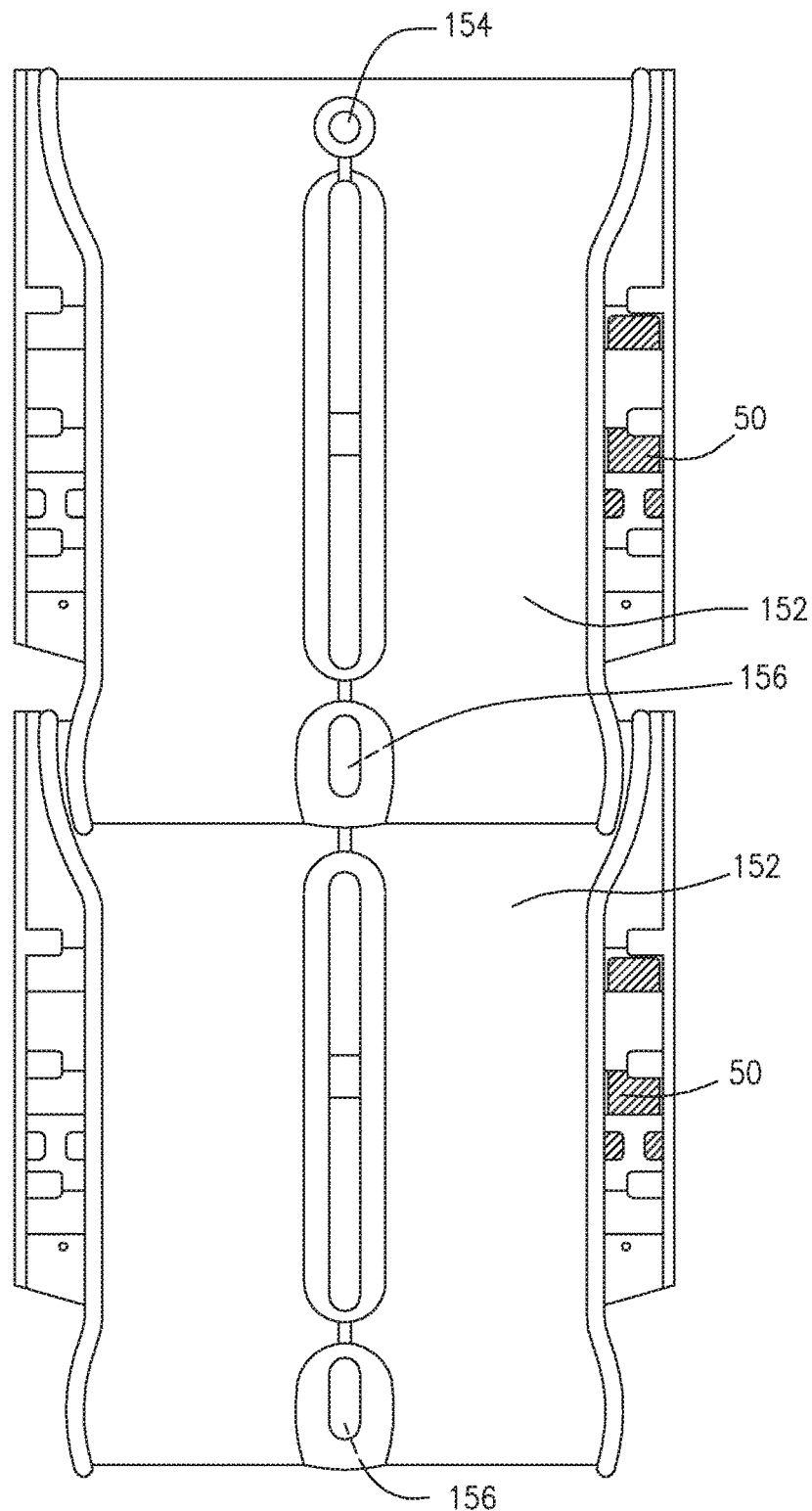
FIG. 10A is a top view of two adjacent second cover members operably linked to each other in accordance with one or more embodiments of the present invention.
Figure 10B:
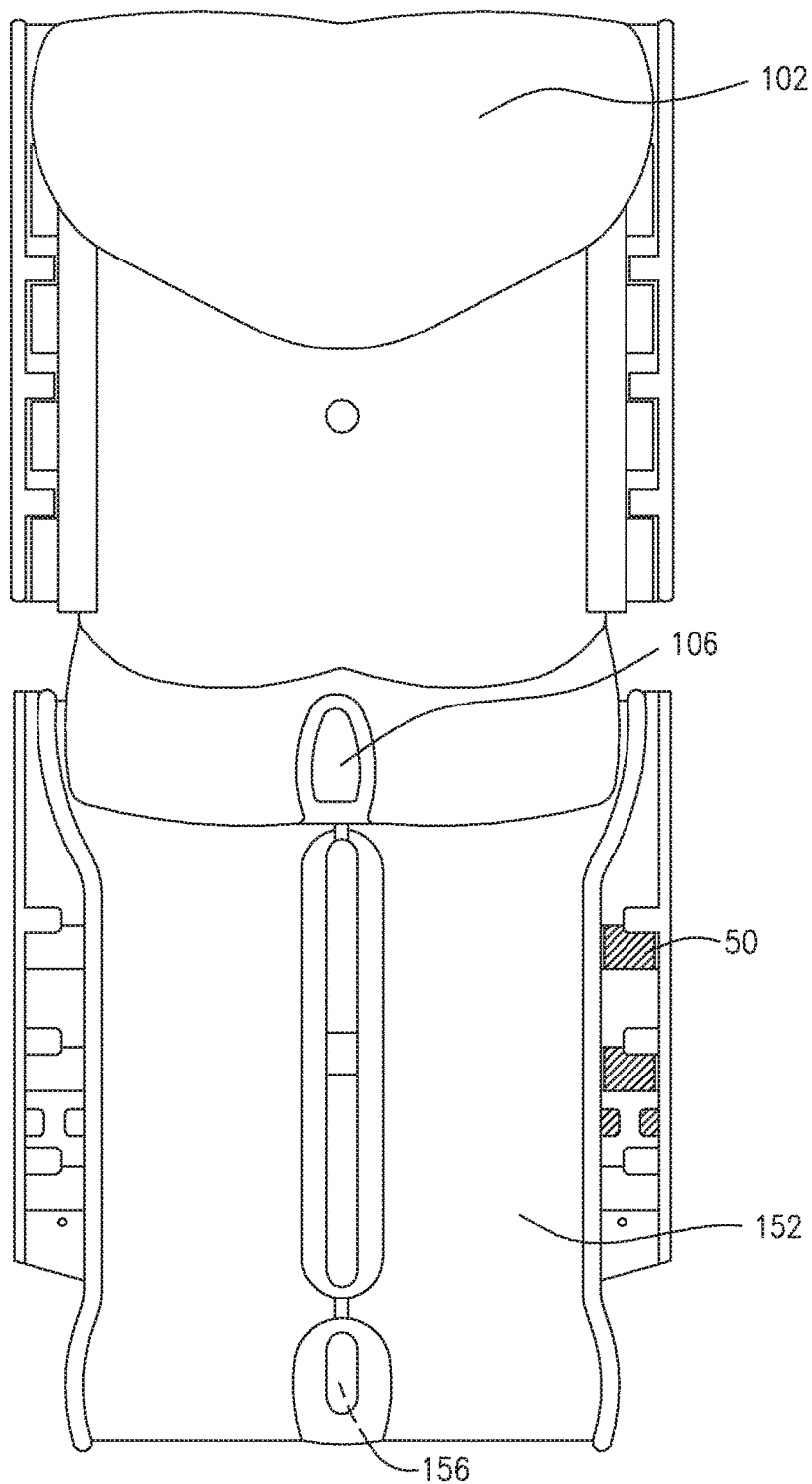
FIG. 10B is a top view of two adjacent second cover members operably linked to each other, and a first cover member positioned in contact with and releasably connected to one of the two adjacent cover members in accordance with one or more embodiments of the present invention.
Figure 10C:
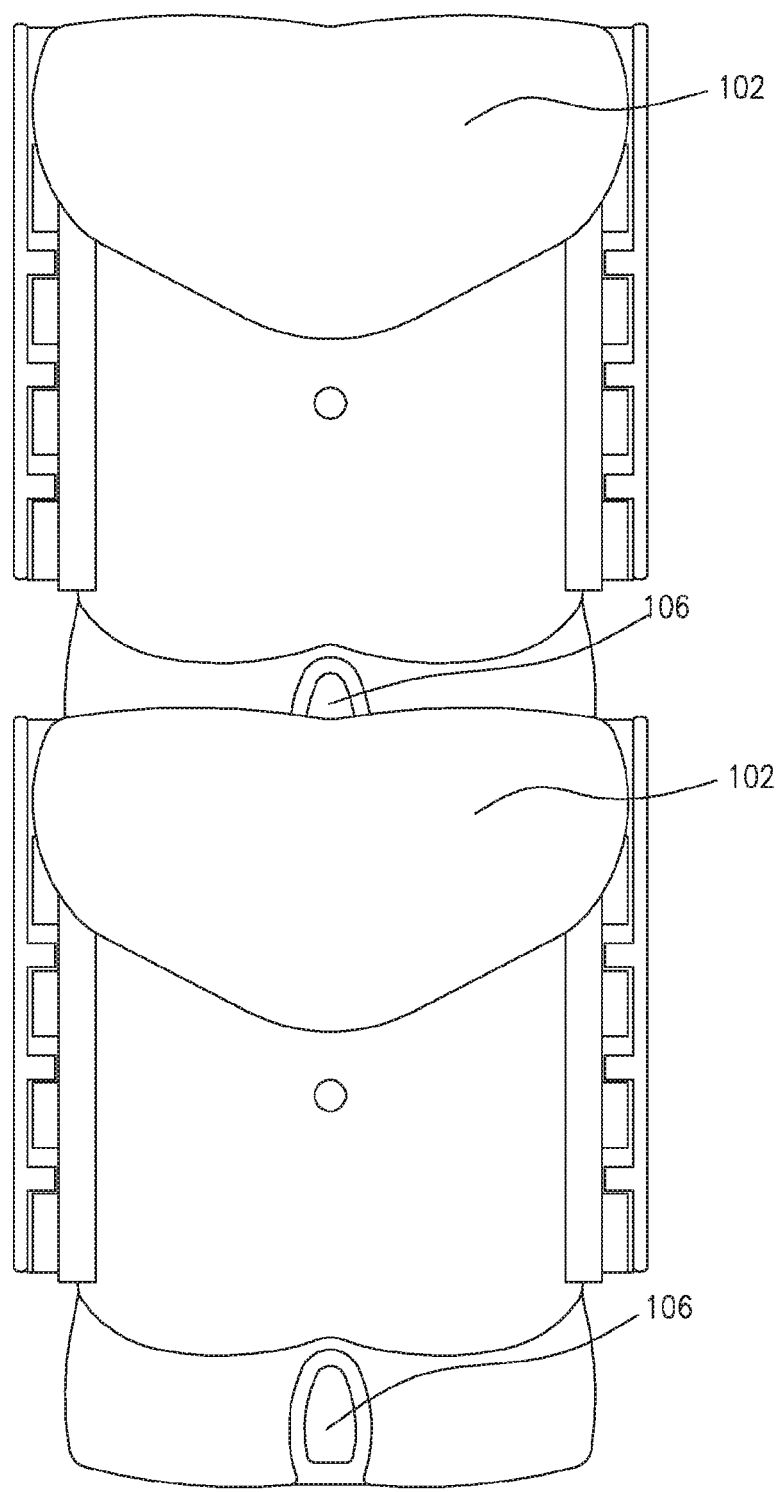
FIG. 10C is a top view of two adjacent second cover members operably linked to each other, and two adjacent first cover members operably linked to each other, and positioned in contact with and releasably connected to the respective second cover members in accordance with one or more embodiments of the present invention.

With further reference to FIGS. 10A-10C, a system including plural covers 100 is provided wherein the plural covers 100 are couplable to provide articulation between adjacent covers 100. The top surface of the second cover member 152 may include a region contoured to receive a portion of, and provide pivotable engagement with, a bottom surface of an adjacent second cover member 152. The region may include the post 154 of the second cover member 152. Recess 156 of second cover member 152 is configured to receive post 154 of a further second cover member 152 to be coupled thereto. With post 154 positioned in recess 156, a pivotable connection is formed between the adjacent second cover members 152. As shown in FIG. 10B, a first cover member 102 is positionable over a second cover member 152. The top surface of the first cover member 102 may include a region contoured to receive a portion of, and provide pivotable engagement with, a bottom surface of an adjacent first cover member 102. The region may include the recess of the first cover member 102.

Figure 11A:
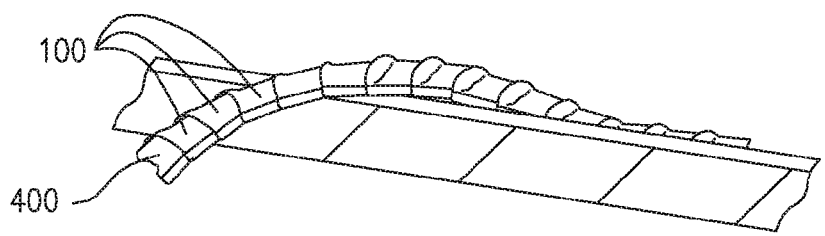
FIGS. 11A and 11B are schematic depictions of systems in accordance with one or more embodiments of the present invention, showing articulation of the system over various terrain changes.
Figure 11B:
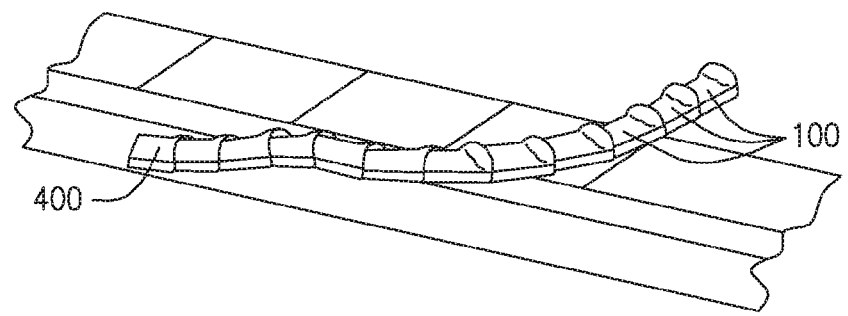

With further reference to FIG. 10C, a further first cover member 102 is positionable over a further second cover member 152, wherein recess 106 of the first cover member already positioned is operable to receive post 104 of the further first cover member. With post 104 positioned in recess 106, a pivotable connection is formed between the adjacent covers 100. Further covers 100 may be added as needed. Adjacent cable protection covers coupled to each other as disclosed herein are moveable in relation to each other, forming an articulated cable protection system. The system is operable to flex in multiple directions including left, right, up and down and various degrees in between without any other parts or attachments. For example, with reference to FIGS. 11A and 11B, a cable protection system 400 is operable to articulate, permitting the plurality of covers housing the cable to bend around corners and over curbs, speed bumps or any other uneven surface. The system 400 may be configured to accommodate any number or size of cables to be protected. The system 400 is configured to completely contain the contained cable such that it protects the cable from outside elements.

The presently disclosed covers and systems may likewise be employed to protect hoses, pipes and the like.

The covers 100 may be constructed of any suitable material. The covers 100 are preferably formed of resilient, durable material so as to be reusable after each use. In one embodiment the first and second cover members 102, 152 are constructed of HDPE, polymers with similar characteristics, fiberglass, metal, ceramic or other materials. The first and second cover members 102, 152 may be unitarily molded covers.

Testing was performed on an embodiment shown in the FIGS. of the present disclosure made from HDPE. A loading force was placed vertically on the top side surface of the cover 100 in those areas most likely to be affected by the weight of a pneumatic tire. A testing assembly was rigidly fixed at the bottom surfaces of the base, where it would rest if placed on a level ground surface. The stress results from the study show that a maximum stress of 7,405 psi was obtained. The point where the material will start to bend is at 4,000 psi. In large part, stresses obtained from 2,500 lbf loading were relatively minor. Displacement results showed that a maximum displacement of 0.260" was obtained at the edge of the larger, unsupported opening when a 2,500 lbf load was applied. Strain results showed that covers in accordance with the presently disclosed subject matter experienced a relatively small amount of strain as a result of the applied load.

Although the devices and systems of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A protective cover comprising a first cover member and a second cover member configured to mate with the first cover member to define at least one conduit operable to enclose a length of material to be protected, the first cover member comprising a top surface comprising a recess formed therein proximate a first end of the first cover member, a bottom surface opposite the top surface comprising a post extending substantially perpendicular from the bottom surface, the post positioned proximate a second end of the first cover member opposite the first end, and at least one mating element disposed along at least a portion of a periphery of the first cover member, the second cover member comprising a top surface comprising a post extending substantially perpendicular therefrom proximate a first end of the second cover member and a bottom surface opposite the top surface comprising a recess formed therein, the recess positioned proximate a second end of the second cover member opposite the first end, and at least one mating element disposed along at least a portion of a periphery of the second cover member, wherein the at least one mating element of the first cover member is operable to releasably engage the at least one mating element of the second cover member, wherein the cover is configured to be articulatably coupled to an adjacent cover.

2. The protective cover of claim 1 wherein the first cover member comprises a wall disposed on and extending substantially perpendicular from the first cover member bottom surface, and the second cover member comprises a wall disposed on and extending substantially perpendicular from the second cover member top surface, wherein at least a portion of the wall of the first cover member and at least a portion of the wall of the second cover member are configured to abut when the first cover member is coupled to the second cover member.

3. The protective cover of claim 1 wherein the first cover member comprises at least one hemispherical section formed in the bottom surface thereof, the at least one hemispherical section oriented along the axis of the first and second ends of the first cover member.

4. The protective cover of claim 1 wherein the second cover member comprises at least one hemispherical section formed in the top surface thereof, the at least one hemispherical section oriented along the axis of the first and second ends of the second cover member.

5. The protective cover of claim 1 wherein the at least one mating element of the first cover member comprises a flange extending from a side thereof and at least one lip depending from the flange, and the at least one mating element of the second cover member comprising a flange extending from a side thereof and at least one lip receiving aperture configured to receive the at least one lip of the first cover member.

6. The protective cover of claim 1 wherein the mating elements of the first cover member and second cover member are operable to be slidably engageable to each other.

7. The protective cover of claim 1 wherein the first cover member comprises an aperture formed through the top and bottom surfaces thereof, and the second cover member comprises an aperture formed through the top and bottom surfaces thereof, wherein the aperture of the first cover member and the aperture of the second cover member are positioned to be in register when the first and second cover members are coupled.

8. The protective cover of claim 5, wherein the at least one flange of the first cover member comprises an aperture formed therein and the at least one flange of the second cover member comprises a further aperture formed therein, wherein the aperture formed in the flange of the first cover member and the further aperture formed on the second cover member are positioned to be in register when the first and second cover members are coupled.

9. The protective cover of claim 1 comprising a quick-release device operable to securably engage the first and second cover members and further operable to release secure engagement of the first and second cover members upon application of pressure to the quick-release device.

10. The protective cover of claim 9 wherein the quick-release device comprises a resilient strip positioned on at least one flange of the second cover member, the strip comprising a detent operable to engage a lip of the first cover member.

11. The protective cover of claim 1 wherein the recess of the second cover member is configured and positioned to receive a post of an adjacent second cover member.

12. The protective cover of claim 1 wherein the recess of the first cover member is configured and positioned to receive a post of an adjacent first cover member.

13. The protective cover of claim 1 wherein the top surface of the second cover member comprises a region contoured to receive a portion of, and provide pivotable engagement with, a bottom surface of an adjacent second cover member.

14. The protective cover of claim 13 wherein the region contoured to receive a portion of a bottom surface of an adjacent second cover member comprises the post.

15. The protective cover of claim 1 wherein the top surface of the first cover member comprises a region contoured to receive a portion of, and provide pivotable engagement with, a bottom surface of an adjacent first cover member.

16. The protective cover of claim 15 wherein the region contoured to receive a portion of a bottom surface of an adjacent first cover member comprises the recess.

17. The protective cover of claim 1 wherein the length of material to be protected is a length of electrical cable.

18. A system according to claim 1 comprising a plurality of the covers.

19. A protective cover system comprising a plurality of protective covers, each of the protective covers comprising a first cover member and a second cover member configured to mate with the first cover member to define at least one conduit operable to enclose a length of material to be protected, the first cover member comprising a top surface comprising a recess formed therein proximate a first end of the first cover member, a bottom surface opposite the top surface comprising a post extending substantially perpendicular from the bottom surface, the post positioned proximate a second end of the first cover member opposite the first end, and at least one mating element disposed along at least a portion of a periphery of the first cover member, the second cover member comprising a top surface comprising a post extending substantially perpendicular therefrom proximate a first end of the second cover member and a bottom surface opposite the top surface comprising a recess formed therein, the recess positioned proximate a second end of the second cover member opposite the first end, and at least one mating element disposed along at least a portion of a periphery of the second cover member, wherein the at least one mating element of the first cover member is operable to releasably engage the at least one mating element of the second cover member, wherein the cover are configured to be articulatably coupled to adjacent covers.

20. The protective cover system of claim 19 wherein the length of material to be protected is a length of electrical cable.

* * * * *